United States Patent [19]

Takenaka

[11] Patent Number: 4,974,465
[45] Date of Patent: Dec. 4, 1990

[54] STEPLESS SPEED CHANGER

[75] Inventor: Norimasa Takenaka, Takatsuki, Japan

[73] Assignee: Tsubakimoto Chain Co., Osaka, Japan

[21] Appl. No.: 359,701

[22] Filed: May 31, 1989

[30] Foreign Application Priority Data

May 31, 1988 [JP] Japan .................................. 63-135171
May 31, 1988 [JP] Japan ............................. 63-73291[U]

[51] Int. Cl.$^5$ ............................................. F16H 15/10
[52] U.S. Cl. .......................................... 74/199; 74/207
[58] Field of Search ................... 74/199, 190, 207, 212

[56] References Cited

U.S. PATENT DOCUMENTS 4,557,155 12/1985 Kopatz .................................... 74/199

FOREIGN PATENT DOCUMENTS 157669   5/1953  Australia ................................ 74/199
1625128  6/1970  Fed. Rep. of Germany ........ 74/199
335910   3/1959  Switzerland ........................... 74/199

Primary Examiner—Leslie A. Braun
Assistant Examiner—Scott Anchell
Attorney, Agent, or Firm—Birch, Stewart, Kolasch and Birch

[57] ABSTRACT

A stepless speed changer is composed of a friction disc which is mounted on a cam shaft and a rotary disc which is in pressing contact with the friction disc. The cam shaft has a hole provided with an inner bearing portion and an outer bearing portion at the inner and outer ends thereof in order to steadily support an output shaft. The cam shaft is axially supported on the case by one bearing.

6 Claims, 3 Drawing Sheets

STEPLESS SPEED CHANGER

BACKGROUND OF THE INVENTION

Field of the Invention

The present invention relates to a stepless speed changer capable of reducing its size and reducing the cost by lessening the number of parts composing the device and shortening the length in the axial direction.

Description of the Related Art

One of the known stepless speed changers has a structure to change the speed by changing the contact point between a pair of discs.

This speed changer is, as schematically shown in FIG. 3, composed of a friction disc (a) on the output side and a rotary disc (b) on the input side which rotates by inclining at a small angle with regard to the center line of rotation of the friction disc (a), and a torque from the input side is transmitted to the output side by pressing the friction disc (a) against the rotary disc (b), and at the same time, the contact point is deflected by moving the rotary disc (b) while maintaining the pressing state, thereby changing the speed.

The friction disc (a) rotates, as stated above, coaxially with the output shaft (c) while being pushed toward the rotary disc (b).

In order to push the friction disc (a), a cam (d) leading to move along the shaft core of the output shaft (c) and a spring (e) thrusting the friction disc (a) toward the rotary disc (b) are provided.

It was therefore necessary to install the cam (d) coaxially with the output shaft (c), and as shown in FIG. 4 conventionally, a cylindrical cam shaft (f) having the cam (d) was mounted on the outside of the output shaft (c), and by a bearing (i) in the cam shaft (f), the output shaft (c) was axially supported, the cam shaft (f) itself was axially supported on a case (g), and the cam shaft (f) and the friction disc (a) were fixed.

Accordingly, for the purpose of axially supporting the cam shaft (f) preceisely and coaxially with the shaft core of the output shaft (c), a plurality of bearings (h) were arranged laterally in the space against the case (g), so that the cam shaft (f) was long, which caused a problem that the dimension of the speed changer in the axial direction became long.

The present invention endeavors to shorten the cam shaft (f), and as a result by firmly supporting pivotally the cam shaft (f) and the output shaft (c), which had been axially supported at one point and let stand purposelessly, the cam shaft (f) could be easily supported axially on the case (g).

SUMMARY OF THE INVENTION

It is, hence, a primary object of the present invention to provide a stepless changer designed basically by supporting the output shaft inside and outside of the hole in the axial direction by the cam shaft and also supporting axially the cam shaft on the case by using a bearing supporting the cam shaft movably in the axial direction, thereby reducing the number of parts in the device, and shortening the length of the gear in the axial direction, so that both downsizing and cost reduction can be achieved.

DETAILED DESCRIPTION OF THE INVENTION

Figure 1:
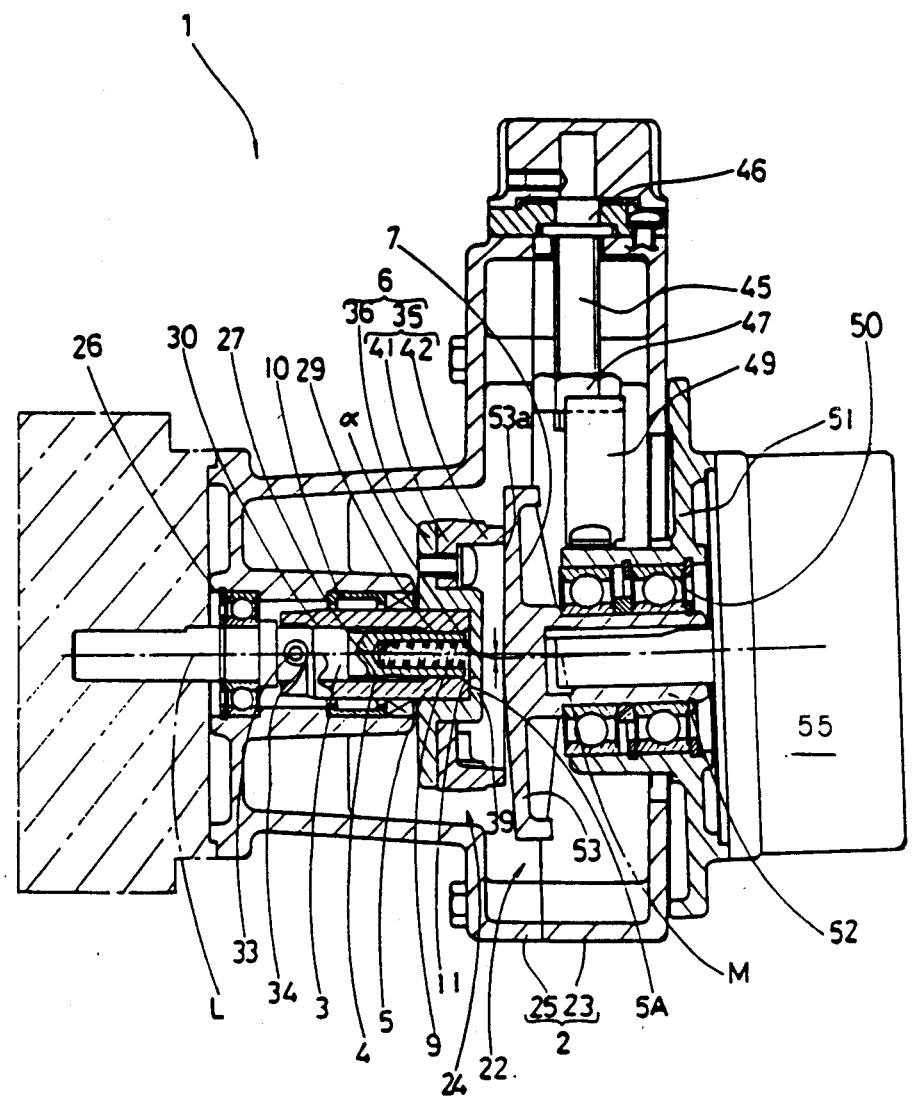
FIG. 1 is a sectional drawing showing an embodiment of the present invention.

Referring now to the drawings, an embodiment of the present invention is described below.

Figure 2:
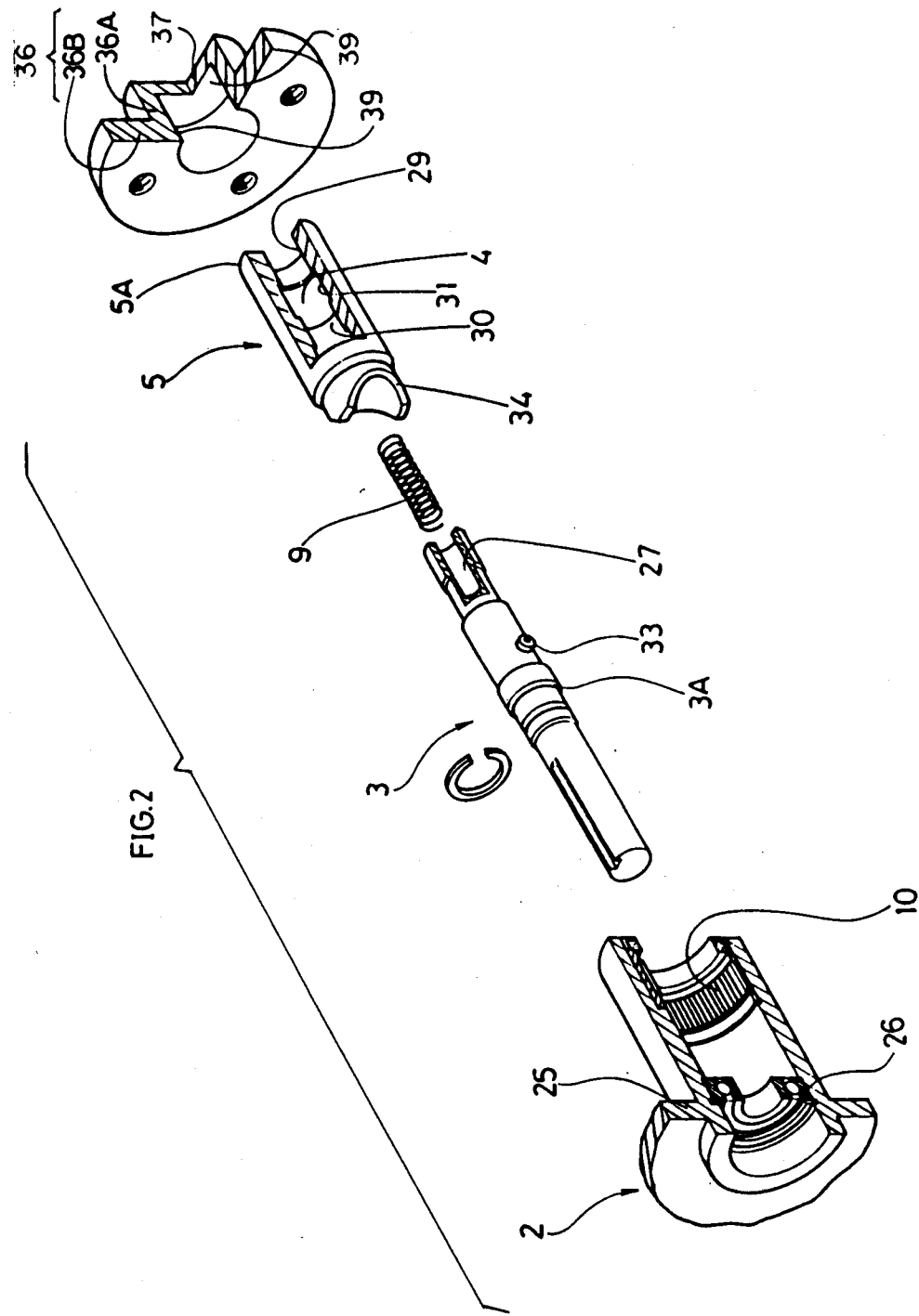
FIG. 2 is an exploded perspective view showing its principal part.
Figure 3:
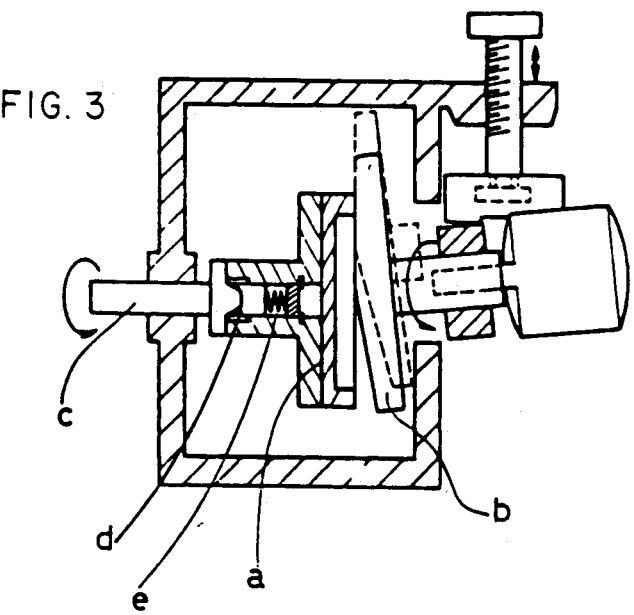
FIGS. 3 and 4 are sectional views showing the prior art.
Figure 4:
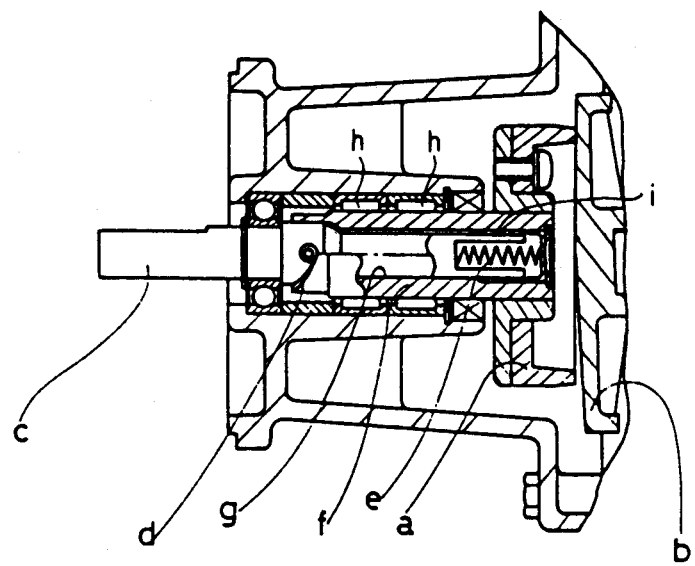

In a stepless speed changer 1, shown in FIGS. 1 and 2, a friction disc 6 and a rotary disc 7 are kept in a case 2. The case 2 is formed by combining a frame 23 on the input side which supports an input part 22 having the rotary disc 7 inside, with a frame 25 on the output side which axially supports an output part 24 equipped with the friction disc 6 by an output shaft 3 and a cam shaft 5.

The output shaft 3 is pivotally supported rotatably by a bearing 26 attached to the outer end of the frame 25 on the output side, and the output shaft 3 is pivotally supported on the case 2 being locked so as not to slip off, wardly in the axial direction, in reference to a motor 55 by making a step part 3A provided inside of the bearing 26 abutting against the inside surface of the bearing 26. In this embodiment, a blind hole 27 pierced from the inner end face is opened in the output shaft 3 at its core.

The cam shaft 5 has a cylindrical shape, and its hole 4 is provided with an inner bearing portion 29 and an outer bearing portion 30 at the inner end and outer end thereof relative to the motor 55 in order to pivotally support the output shaft 3. The two bearing portions 29 and 30 are coupled together by a cutoff part 31 having a larger diameter than the bearing portions 29 and 30. A face cam 34 engaging with a cam pin 33 projecting from the circumferential surface of the output shaft 3 is formed on the cam shaft 5 by notching its outer end in a V-shape.

To the inner end 5A of the cam shaft 5, a boss 36A of a hub body 36, to which the friction disc 6 is attached is affixed, and the circumferential surface is pivotally supported by a bearing 10 which is attached to the frame 25 on the output side of the case 2.

The bearing 10 is a needle bearing in this embodiment, which axially supports the cam shaft 5 movable in the axial direction.

The cam shaft 5 is made of bearing material obtained by baking powdery metal by using a mold, and impregnating with lubricating oil. By using an integrally formed bearing material as the cam shaft 5, the cam shaft 5 can be easily formed ever if it is in a complicated shape.

Using sintered metal makes it possible to harden the friction parts, including the face cam 34, if necessary, thereby enhancing the durability of the cam shaft 5. As the bearing material, aside from the sintered metal, copper compounds blended with solid lublicating agents such as graphite, and moreover ceramics and synthetic resins may be used. The cam shaft 5 can be further formed by coating the surface, in particular, at the hole 4 on which the bearing portions 29 and 30 are formed, with a film of bearing materials, such as molybdenum disulfide, ceramics and tetrafluoroethylene resin. It is further possible to form the cam 5 by using materials other than the bearing materials, such as ordinary steel, and to insert a slide bearing or a rolling bearing, which is separate from the cam shaft 5, into the bearing portions 29 and 30.

The friction disc 6 is composed of a disc base 35 abrading and contacting with the rotary disc 7 and a hub body 36 to which the disc base is attached.

The hub body 36 is formed by projecting a disc-shaped flange 36B, to which the friction disc 6 is attached, from a boss 36A pinching the inner end 5A of the cam shaft 5 from the outside, and on the boss 36A, and inner hole 39 is opened outward, of which the inner side, that is, the side facing the rotary disc 7, is closed by a side wall 37. Into the inner hole 39, the inner end 5A of the cam shaft 5 is inserted, and the hub body 36 and the cam shaft 5 are firmly fixed by press-fitting or key-fixing.

By the fixing of the hub body 36 and the cam shaft 5, the side wall 37 closes the hole 4 of the cam shaft 5 at the inner end to form a closing part 11.

The tip of a spring member 9, which extends in a coil form from the deeper end of the blind hole in the output shaft 3 and is made of a compression spring, abuts against the closing part 11.

In this way, the spring member 9 is installed between the inner end of the output shaft 3 and closing part 11, and the spring member 9 thrusts the integrally formed cam shaft 5 and the hub body 36 on the axial line of the output shaft 3, that is, from the output-side center line of rotation L inward.

The friction disk 6 flanks the end surface of the input side of the flange 36B and laterally projects a ring-shaped protrusion 42 from a disc-shaped base 41 which is fixed by bolting toward the rotary disk 7, and the tip of the protrusion 42 abuts against the rotary disk 7.

Accordingly, the friction disc 6 is fixed and formed integrally with the cam shaft 5, and can be rotated together with the output shaft 6 with the output-side center line of rotation L as the center, and the top of the protrusion 42 is pressed against the rotary disc 7 by the action force in the axial direction generated from the face cam 34 when the thrusting force of the spring member 9 is applied or when rotated.

An input part 22 comprises a nut piece 47 which is screwed into a screw part 45 of a supporting shaft 46 pivotally supported on a frame 23 on the input side, having the screw part 45 at its bottom, and a bracket 51 having a hole 5 capable of pivotally supporting the rotary disc 7 is fixed to a mounting piece 49 capable of moving vertically by the rotation of the supporting shaft 46.

The rotary disc 7 comprises a boss 52 in which input-side center line of rotation M inclines at a small angle α with regard to the output-side center line of rotation L of the friction disc 6, and a driving plate 53 is attached to the output side of the boss 52.

The hole 50 in the bracket 51 is pierced by inclining at the same angle as that of the boss 52, and the boss 52 is pivotally supported rotatably on the bracket 51 through a bearing.

The driving plate 53 has its face 53a confronting the output side formed in a conically convex shape having an inclining angle equal to the small angle α of the axial hole of the boss 52, so that the face 53a forms a driving surface capable of moving roughly orthogonally to the output-side center line of rotation L, along with the vertical movement of the input part 22, and to abut against the protrusion 42 of the friction disc 6.

The rotary disc 7 has a motor 55 mounted on its input-side center line of rotation M, and the case of the motor 55 is affixed to the bracket 51.

As a result, the rotation of the motor 55 causes the rotary disc 5 to rotate, and the rotation can be transmitted to the friction disc 6 abutting against the rotary disc 5.

In addition, the rotation of the supporting shaft 46 causes the input part 22 to move vertically, and by this movement the part contacting with the protrusion 42 deflects in the radial direction of the rotary disc 7. The deflection, in turn, increases or decreases the rotation speed of the friction disc 6, in spite of the constant speed rotation of the motor, thereby changing the speed.

On the other hand, the output shaft 3 is locked so as not to slip off outward in the axial direction by letting the step part 3A abut against the inside surface of the bearing 26, and the thrusting force of the spring member 9 makes it possible to press the hub body 36 on which the friction disc is mounted, toward the rotary disc 7.

Since the cam shaft pivotally supports the output shaft 3 by two bearing portions 29 and 30, installed inside and outside of the hole 4 in the axial direction, the output shaft 3 and cam shaft 5 can be supported without inclining toward each other, and furthermore, as the cam shaft 5 is formed by using bearing materials, it is unnecessary to install another bearing member on the bearing portions 29 and 30.

By the fact that the cam shaft 5 and the output shaft 3 pivotally attach to each other precisely, the cam shaft 5 can be held and supported to the case effortlessly, the cam shaft 5 can be sufficiently supported by a singular bearing 10 and the width of the cam shaft 5 can be shortened notably, and hence the case can be reduced in size.

In addition, since the closing part 11, which stops an end of the spring member 9, is formed by fixing the firction disc 6 integrally to the cam shaft 5, not only the number of the parts can be reduced but also the mounting work becomes easier in comparison with existing structures where another fitting piece is installed on the hole 4.

The present invention can be modified in various ways. For example, the closing part 11 may have a gap formed in its side wall 37 in such a manner as not to allow the internal oil and fats to escape in order to prevent the rise of the internal pressure of the hole.

In the stepless speed changer designed in the above manner, the torque of the rotary disc can be transmitted to the friction disc by the rotary disc being pressed against the friction disc. By moving the rotary disc in the orthogonal direction with regard to the output-side center line of rotation of the friction disc, the contacting position between the discs moves in the radial direction, and the movement decreases or increases the rotation speed of the friction disc, thereby changing the rotation speed of the output shaft.

Since the cam shaft pivotally supports the output shaft with the inner and outer bearing portions of the hole, the cores of the cam shaft and the output shaft can be precisely matched, and, accordingly, the cam shaft can be axially supported on the case sufficiently by a singular bearing, which makes it unnecessary to arrange a plurality of bearings as required in the existing gears. As a result, the cases for the output shaft and the cam shaft can be shortened, and when forming the cam shaft by using a bearing member, the cam shaft can pivotally support the output shaft directly without a bearing, thereby reducing the component parts of the gear, and being easily supported at the inside and outside the hole in the axial direction.

As described above, in the stepless speed changer of the present invention, the cam shaft supports the output shaft steadily, pivotally and concentrically with the hole and the cam shaft is axially supported on the case by using one bearing. It is therefore possible to reduce the number of parts composing the gear comparing with that in the existing structure holding the cam shaft by arranging a plurality of bearings, thereby reducing the cost, and downsizing the device. When forming the cam shaft by using such bearing material, as described in this embodiment, the pivotal support of the output shaft is further facilitated, the number of parts is further reduced and the device becomes further smaller in size.

When forming a closing part on the friction disc, the part incorporating the spring to apply the thrusting force to the friction part can be easily assembled, and the number of parts and cost can be reduced in comparison with the existing gear using a fitting piece for spring-detent installed separately in the hole.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A stepless changer comprising:
   a motor,
   a case,
   an output shaft locked so as not to slip off said speed changer in an axial direction away from said motor, pivotally supported on said case;
   a cam shaft axially supported in said case and having a hole in which said output shaft is inserted;
   a friction disc affixed at an inner end of said cam shaft proximate to said motor;
   a rotary disc having an input-side center line which is inclined at a small angle with regard to an output-side center line of said friction disc, capable of moving roughly at a right angle to said output-side center line and pressed against said friction disc;
   a spring member for thrusting said cam shaft in an axial direction, said hole of said cam shaft having an inner bearing portion and an outer bearing portion at an inner proximate and outer distal end thereof, relative to said motor, for pivotally supporting said output shaft, and
   a single bearing for pivotally supporting said cam shaft on said case, said single bearing axially supporting said cam shaft movably in said axial direction.

2. A stepless speed changer as in claim 1, wherein said cam shaft is formed by using a bearing material.

3. A stepless speed changer as in claim 1, wherein said output shaft has a blind hole at an inner end thereof proximate to said motor extending in said axial direction for storing said spring member.

4. A stepless speed changer as in claim 1, wherein said one bearing is a needle bearing.

5. A stepless speed changer as in claim 1, wherein said friction disc has a closing part affixed to said inner end of said cam shaft thereby shutting said hole at said inner end, and said spring member is placed between said closing part and an inner end of said output shaft.

6. A stepless speed changer as in claim 5, wherein said friction disc is composed of a disc base contacting with and abrading said rotary disc and a rib body having said closing part, supporting said disc base and affixed at said inner end of said cam shaft.

* * * * *